(12) United States Patent
Polidora et al.

(10) Patent No.: US 10,438,709 B2
(45) Date of Patent: Oct. 8, 2019

(54) MEASUREMENT APPARATUS FOR DETERMINING COMPRESSIVE LOADING THAT WILL BE APPLIED TO A FUEL ROD OF A PRESSURIZED WATER REACTOR

(71) Applicant: WESTINGHOUSE ELECTRIC COMPANY LLC, Cranberry Township, PA (US)

(72) Inventors: James T. Polidora, North Huntingdon, PA (US); Shawn D. Lazeski, Pleasant Unity, PA (US); John W. Conrad, Butler, PA (US)

(73) Assignee: Westinghouse Electric Company LLC, Cranberry Township, PA (US)

( * ) Notice: Subject to any disclaimer, the term of this patent is extended or adjusted under 35 U.S.C. 154(b) by 831 days.

(21) Appl. No.: 14/985,537

(22) Filed: Dec. 31, 2015

(65) Prior Publication Data

US 2017/0194064 A1    Jul. 6, 2017

(51) Int. Cl.
*G21C 17/10* (2006.01)
*G21C 1/08* (2006.01)
(Continued)

(52) U.S. Cl.
CPC ............ *G21C 17/10* (2013.01); *G21C 1/086* (2013.01); *G21C 3/334* (2013.01); *G21C 17/06* (2013.01); *G21C 3/356* (2013.01); *Y02E 30/40* (2013.01)

(58) Field of Classification Search
CPC ........ G21C 17/10; G21C 3/334; G21C 3/356; G01L 1/22; G01L 1/04; G01B 5/30; G01B 7/16
See application file for complete search history.

(56) References Cited

U.S. PATENT DOCUMENTS

| 4,589,082 A | * | 5/1986 | Parker | G21C 17/06 |
| | | | | 702/135 |
| 4,756,867 A | * | 7/1988 | Blocquel | G01B 5/08 |
| | | | | 376/248 |

(Continued)

FOREIGN PATENT DOCUMENTS

| EP | 0501663 A1 | 2/1992 |
| JP | 10507265 A | 7/1998 |
| KR | 19860001168 B1 | 5/1994 |

OTHER PUBLICATIONS

PCT/US2016/061947, International Search Report and Written Opinion, dated Feb. 20, 2017, 10 Pages.

*Primary Examiner* — Lily C Garner
(74) *Attorney, Agent, or Firm* — Joseph C. Spadacene; Westinghouse Electric Company LLC

(57) ABSTRACT

An improved measurement apparatus employs a support that includes a housing and that further includes a follower that is movably situated on the support. The follower is biased in a direction generally away from the housing. The housing and follower are receivable between a spring/dimple pair, and a sensor detects the distance between the housing and the follower when interposed between the spring and dimple. An indicator apparatus employs the signal to output and indication that is representative of the amount of compressive loading that will be applied to a fuel rod by the spring/dimple pair, and the indication is based at least in part upon the distance between the portion of the housing that is engaged with the dimple and the portion of the follower that is engaged with the spring.

7 Claims, 4 Drawing Sheets

(51) Int. Cl.
*G21C 3/334* (2006.01)
*G21C 17/06* (2006.01)
*G21C 3/356* (2006.01)

(56) References Cited

U.S. PATENT DOCUMENTS

| | | | |
|---|---|---|---|
| 5,343,504 A | | 8/1994 | Gaylord, Jr. et al. |
| 5,357,547 A | * | 10/1994 | Obermeyer ............ G21C 17/10 376/254 |
| 5,490,418 A | | 2/1996 | Rebours et al. |
| 6,385,269 B1 | * | 5/2002 | Gaylord, Jr. ......... G21C 3/3424 376/245 |
| 7,551,705 B2 | * | 6/2009 | Pabis .................... G21C 3/334 376/260 |

\* cited by examiner

MEASUREMENT APPARATUS FOR DETERMINING COMPRESSIVE LOADING THAT WILL BE APPLIED TO A FUEL ROD OF A PRESSURIZED WATER REACTOR

BACKGROUND

1. Field

The disclosed and claimed concept relates generally to nuclear power plants, and, more particularly, to a measurement apparatus that is operable to determine the amount of compressive loading that will be applied between a spring and a dimple of a grid of a pressurized water reactor to a fuel rod situated between the spring and the dimple.

2. Related Art

Nuclear power plants may be of various configurations. One type of nuclear power plant employs a nuclear reactor to generate steam which is employed to turn one or more turbines that operate electrical generators. One type of reactor is a pressurized water reactor (PWR). Such a PWR operates by heating water within a primary cooling loop which is maintained at an elevated pressure. A steam generator, which can be characterized as a type of heat exchanger, thermally connects the primary cooling loop with a secondary cooling loop and generates steam in the secondary cooling loop. The secondary cooling loop is connected with the turbines and with a heat sink such as a cooling tower.

In most pressurized water nuclear reactors, a reactor core is comprised of a large number of elongated fuel assemblies. These fuel assemblies typically include a plurality of cylindrical fuel rods that are held in an organized array by a plurality of grids that are spaced axially along the length of the fuel assembly and are attached to a plurality of elongated thimble tubes of the fuel assembly. The thimble tubes typically receive control rods or instrumentation therein. Top and bottom nozzles on opposite ends of the fuel assembly are secured to the ends of the thimble tubes that extend slightly above and below the ends of the fuel rods.

The grids are formed of straps of metal that are connected together to form a plurality of cells. Each cell generally has a spring/dimple pair that engages a fuel rod therebetween and has another spring/dimple pair that similarly engages the fuel rod. As a general matter, the spring of each spring/dimple pair is relatively more compliant than the corresponding dimple of the spring/dimple pair. One spring/dimple pair retains the fuel rod in one direction transverse to the longitudinal extent of the fuel rod, and the other spring/dimple pair retains the rod in another direction transverse to the longitudinal extent of the rod. While such grids and their spring/dimple pairs have been generally effective for their intended purposes, they have not been without limitation.

As is generally understood in the relevant art, the springs and dimples of the grids can become relaxed over time due to factors such as heat, neutron bombardment, fatigue, and other such factors. As such, it is desirable to periodically assess the amount of compressive load that will be applied by the springs and dimples to the fuel rod to assess whether remedial action is needed. Previous systems for measuring the compressive load have, however, met with limitations since they were capable of determining only whether the overall load of two spring/dimple pairs within the cell had insufficient compressive loading and were therefore unable to assess whether an individual spring/dimple pair was deficient in its compressive loading. Improvements thus would be desirable.

SUMMARY

An improved measurement apparatus employs a support that includes a housing and that further includes a follower that is movably situated on the support. The follower is biased in a direction generally away from the housing. The housing and follower are receivable between a spring/dimple pair, and a sensor detects the distance between the housing and the follower when interposed between the spring and dimple. An indicator apparatus employs the signal to output and indication that is representative of the amount of compressive loading that will be applied to a fuel rod by the spring/dimple pair, and the indication is based at least in part upon the distance between the portion of the housing that is engaged with the dimple and the portion of the follower that is engaged with the spring.

Accordingly, an aspect of the disclosed and claimed concept is to provide an improved measurement apparatus that provides an indication of the compressive loading that will be applied to a fuel rod when received between a spring and a dimple of a grid.

Another aspect of the disclosed and claimed concept is to provide an improved measurement apparatus that determines the amount of compressive loading that will be applied to a fuel rod by a single spring/dimple pair within a cell of a grid without interference from the other spring/dimple pair of the cell.

Another aspect of the disclosed and claimed concept is to provide an improved measurement apparatus that directly measures the distance between a single spring and a single dimple within a cell of a grid, and that outputs an indication of the compressive loading that will be applied to a fuel rod by the single spring and the single dimple based at least in part upon the distance therebetween.

Accordingly, an aspect of the disclosed and claimed concept is to provide an improved measurement apparatus operable to indicate an amount of compressive loading that will be applied to a rod having fissile material by a spring and a dimple of a grid of a fuel assembly when the rod is received between the spring and the dimple. The measurement apparatus can be generally stated as including a support having a housing, a portion of the housing being structured to physically contact one of the spring and the dimple, a follower movably situated on the support, a portion of the follower being situated opposite the portion of the housing and being biased in a direction generally away from the portion of the housing, the portion of the follower being structured to be physically contacted by the other of the spring and the dimple and to have its bias overcome to move the follower between a first position out of physical contact with the other of the spring and the dimple and a second position in physical contact with the other of the spring and the dimple, and an indicator apparatus structured to provide an indication that is representative of the amount of compressive loading that will be applied to the rod, the indication being based at least in part upon the distance between the portion of the housing and the portion of the follower in the second position.

BRIEF DESCRIPTION OF THE DRAWINGS

A further understanding of the disclosed and claimed concept can be gained from the following Description when read in conjunction with the accompanying drawings in which:

Similar numerals refer to similar parts throughout the specification.

DESCRIPTION

Figure 1:
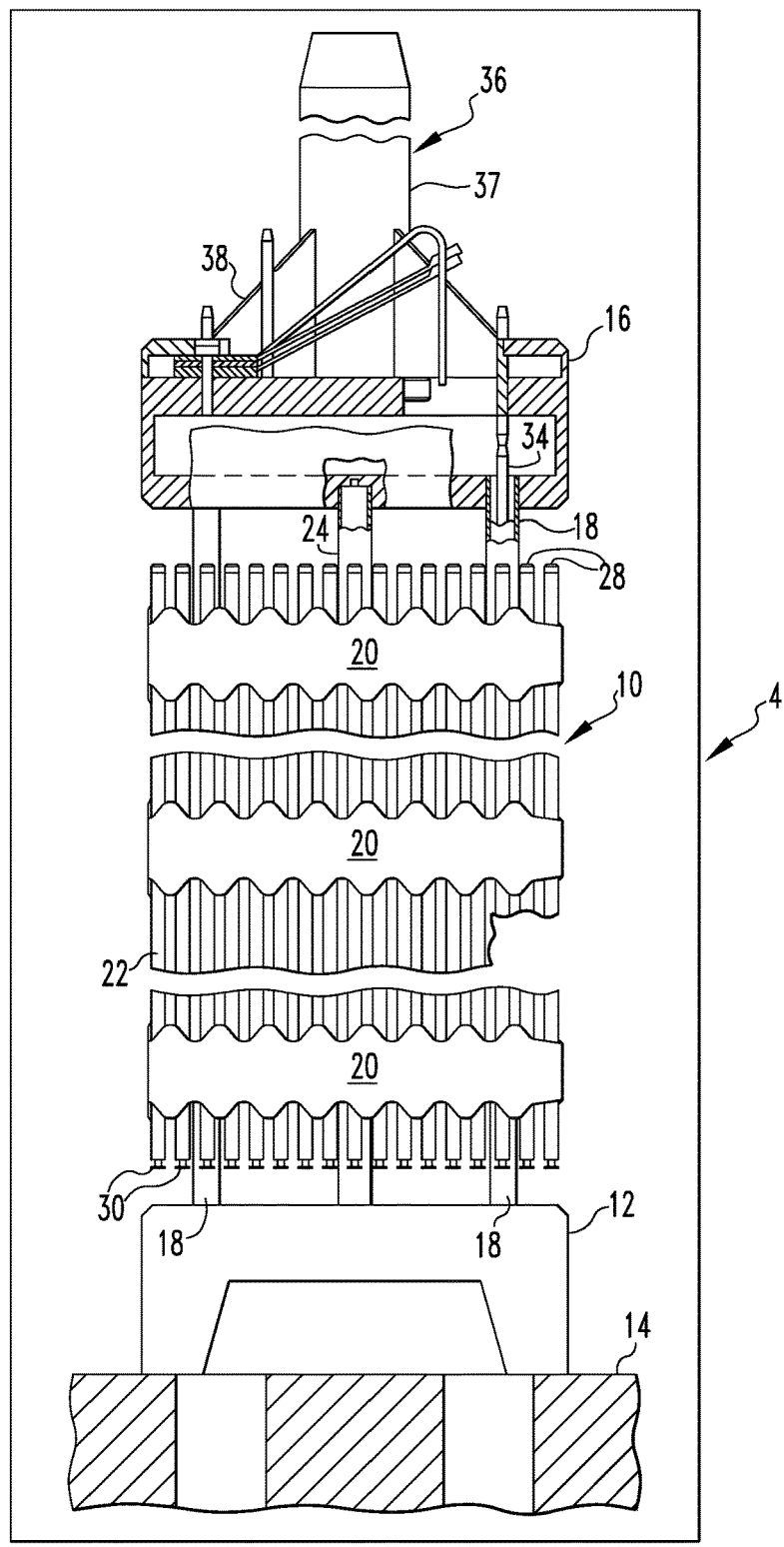
FIG. 1 is a schematic depiction of a PWR type nuclear reactor including a schematically depicted and foreshortened fuel assembly, partially in section, having grids whose compressive loading is measured by the apparatuses and methodologies that are set forth hereinbelow.

An exemplary fuel assembly 10 mounted in a schematically depicted nuclear reactor 4 is depicted generally in FIG. 1. One or more of the various components of the fuel assembly 10 and/or other components can be referred to as the internals of the reactor 4.

The fuel assembly 10 includes a bottom nozzle 12 that supports the fuel assembly 10 on a lower core support plate 14 in the core region of the nuclear reactor 4. The nuclear reactor 4 is a pressurized water reactor that includes a plurality of the fuel assemblies 10 disposed on the core support plate 14. In addition to the bottom nozzle 12, the structural skeleton of the fuel assembly 10 also includes a top nozzle 16 at its upper end and a number of elongated guide tubes or thimble tubes 18 which extend longitudinally between the bottom and top nozzles 12 and 16 and at opposite ends are connected therewith.

The fuel assembly 10 further includes a plurality of transverse grids 20 axially spaced along and mounted to the thimble tubes 18 and an organized array of elongated fuel rods 22 transversely spaced and supported by the grids 20. Also, the exemplary fuel assembly 10 depicted in FIG. 1 includes an instrumentation tube 24 located in the center thereof that extends between the bottom and top nozzles 12 and 16. With such an arrangement of parts, the fuel assembly 10 forms an integral unit capable of being conveniently handled without damaging the assembly parts.

As mentioned above, the fuel rods 22 in the array thereof in the fuel assembly 10 are held in spaced relationship with one another by the grids 20 spaced along the length of the fuel assembly 10. Each fuel rod 22 includes a plurality of nuclear fuel pellets and is closed at its opposite ends by upper and lower end plugs 28 and 30. The fuel pellets are composed of fissile material and are responsible for creating the reactive power of the nuclear reactor 4.

A liquid moderator/coolant such as water, or water containing boron, is pumped upwardly through a plurality of flow openings in the lower core plate 14 to the fuel assembly 10. The bottom nozzle 12 of the fuel assembly 10 passes the coolant flow upwardly through the thimble tubes 18 and along the fuel rods 22 of the assembly in order to extract heat generated therein for the production of useful work.

To control the fission process, a number of control rods 34 are reciprocally movable in the thimble tubes 18 located at predetermined positions in the fuel assembly 10. Specifically, a rod cluster control mechanism 36 positioned above the top nozzle 16 supports the control rods 34. The control mechanism 36 has an internally threaded cylindrical member 37 with a plurality of radially extending arms 38. Each arm 38 is interconnected to a control rod 34 such that the control mechanism 36 is operable to move the control rods 34 vertically in the thimble tubes 18 to thereby control the fission process in the fuel assembly 10, all in a well-known manner.

Figures 4, 5:
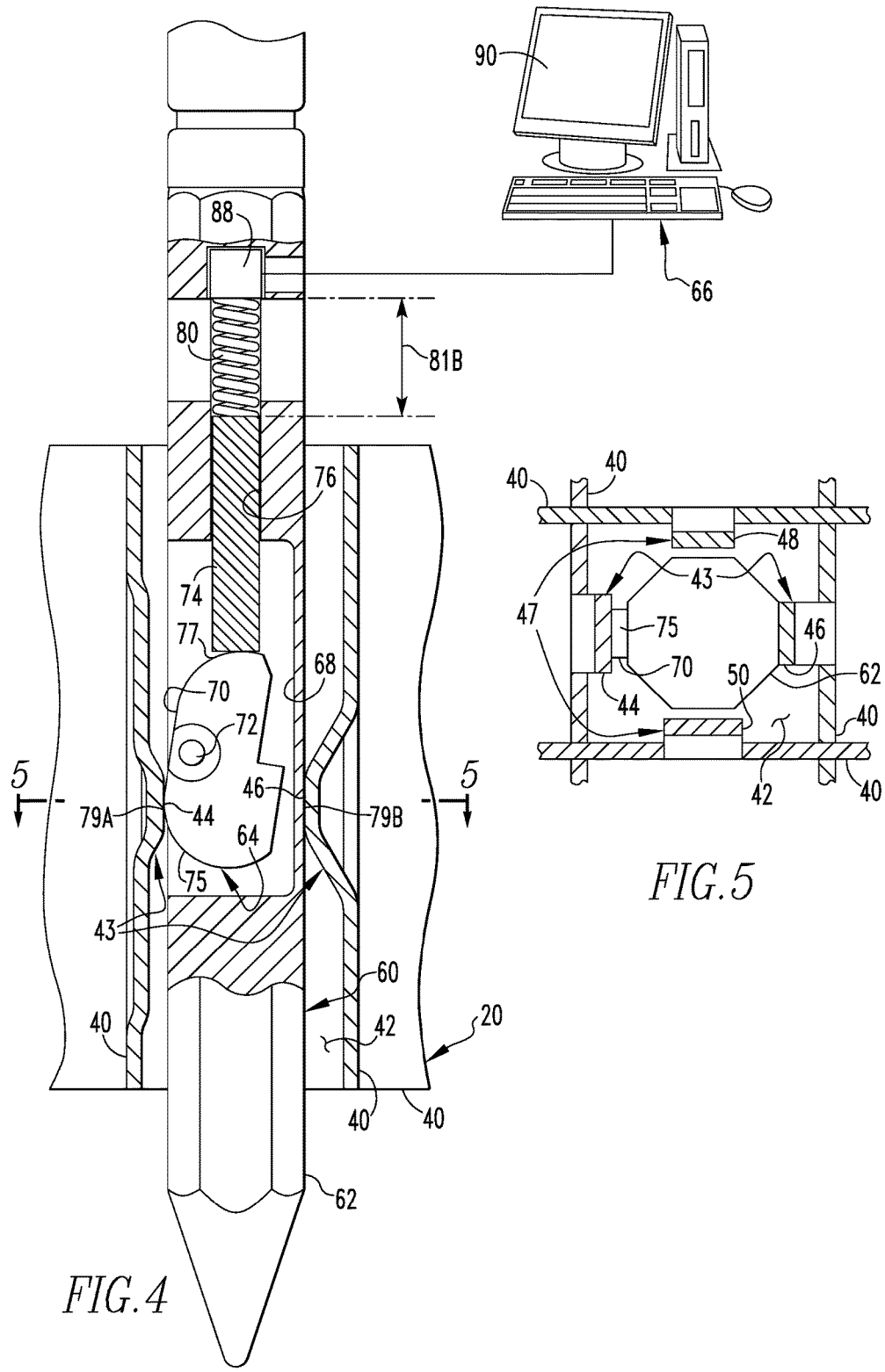
FIG. 4 is a view similar to FIG. 3, except depicting the follower assembly and a housing of the measurement apparatus being interposed between a spring and a dimple of the cell.
FIG. 5 is a sectional view as taken along line 5-5 of FIG. 4.

The grids 20 that are shown in an exemplary fashion in FIG. 1 are constructed of a plurality of straps 40 (such as are shown in FIG. 5) that are arranged to form a plurality of cells, with one such cell being depicted at the numeral 42 in FIG. 5. The cell 42 is depicted as including a first spring/dimple pair 43 that includes a first spring 44 and a first dimple 46 that are formed in separate straps 40 and that are opposed to one another. The cell 42 is further depicted in FIG. 5 as including a second spring/dimple pair 47 that includes a second spring 48 and a second dimple 50 that are formed in separate straps 40 and that are opposed to one another. The first spring/dimple pair 43 and the second spring/dimple pair 47 together retain a fuel rod 22 in a given position within the cell 42 and with respect to the fuel assembly 10. While each spring/dimple pair 43 and 47 is depicted as including a single spring and a single dimple directly opposed to one another, it is understood that each spring/dimple pair could have different numbers of springs and/or dimples opposed to one another, and they could be other than directly opposed to one another and/or be in other positional relationships to one another without departing from the present concept.

Figure 2:
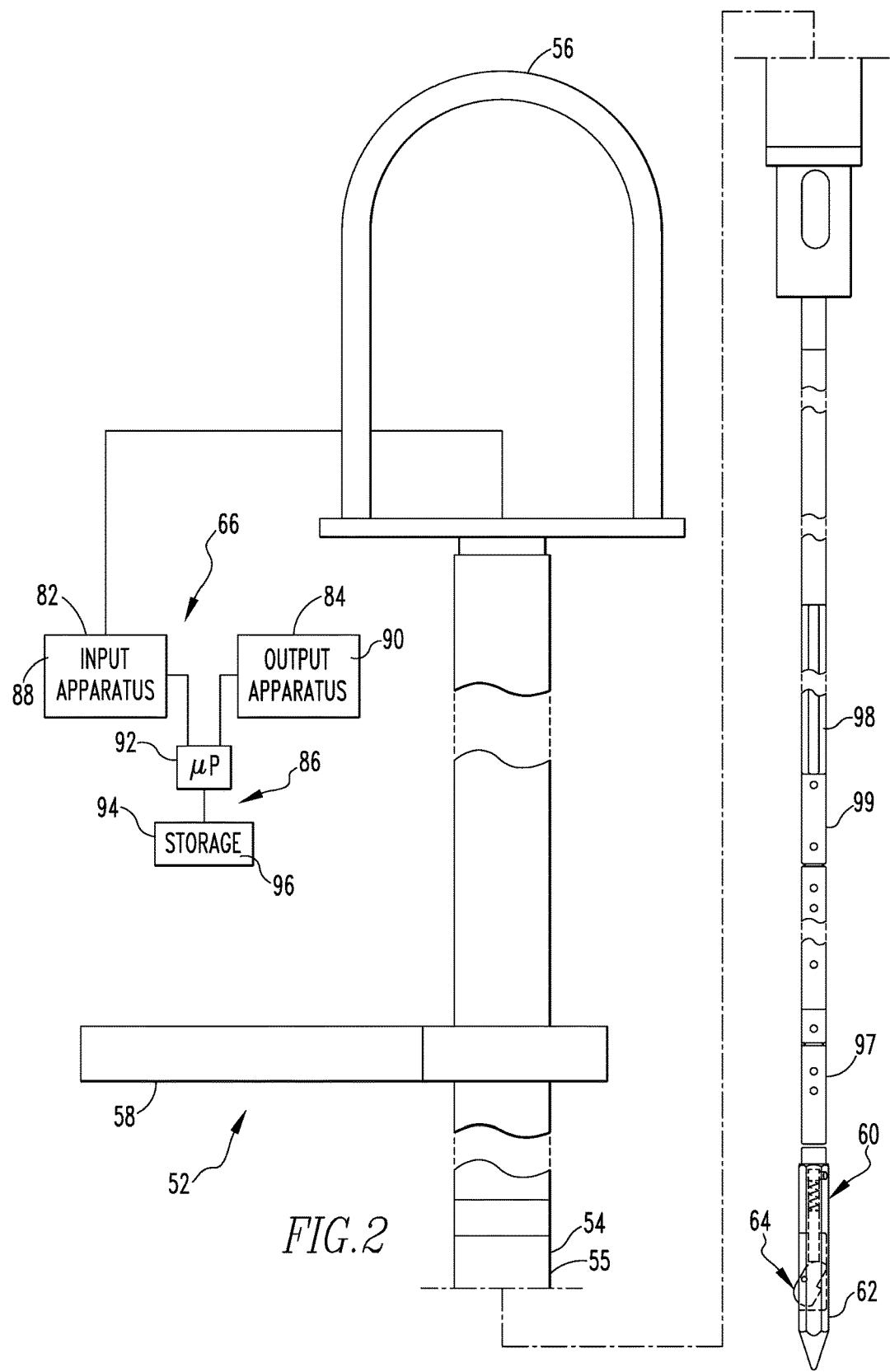
FIG. 2 is an elevational view of an improved measurement apparatus in accordance with the disclosed and claimed concept.

An improved measurement apparatus 52 in accordance with the disclosed and claimed concept is depicted in FIG. 2. The measurement apparatus 52 includes an elongated leg 54 that serves as a support 55 for a bail 56, a flag 58, and a detection apparatus 60 of the measurement apparatus 52. The measurement apparatus 52 further includes an indicator apparatus 66 that is described in greater detail hereinbelow. As a general matter, the measurement apparatus 52 is suspended by the bail 56 which is carried by the hook of a winch or other such device that supports the measurement apparatus 52 and moves it in a vertical direction, both up and down. The flag 58 protrudes from the leg 54 in a direction generally transverse to the longitudinal extent of the leg 54 and is movable with respect to the leg 54 for reasons that will be set forth in greater detail hereinbelow. The leg 54 is movable in the vertical direction by the aforementioned winch or other such device in order to receive the leg 54 in the various cells 42 of the grids 20 of the fuel assembly 10 of FIG. 1.

Figure 3:
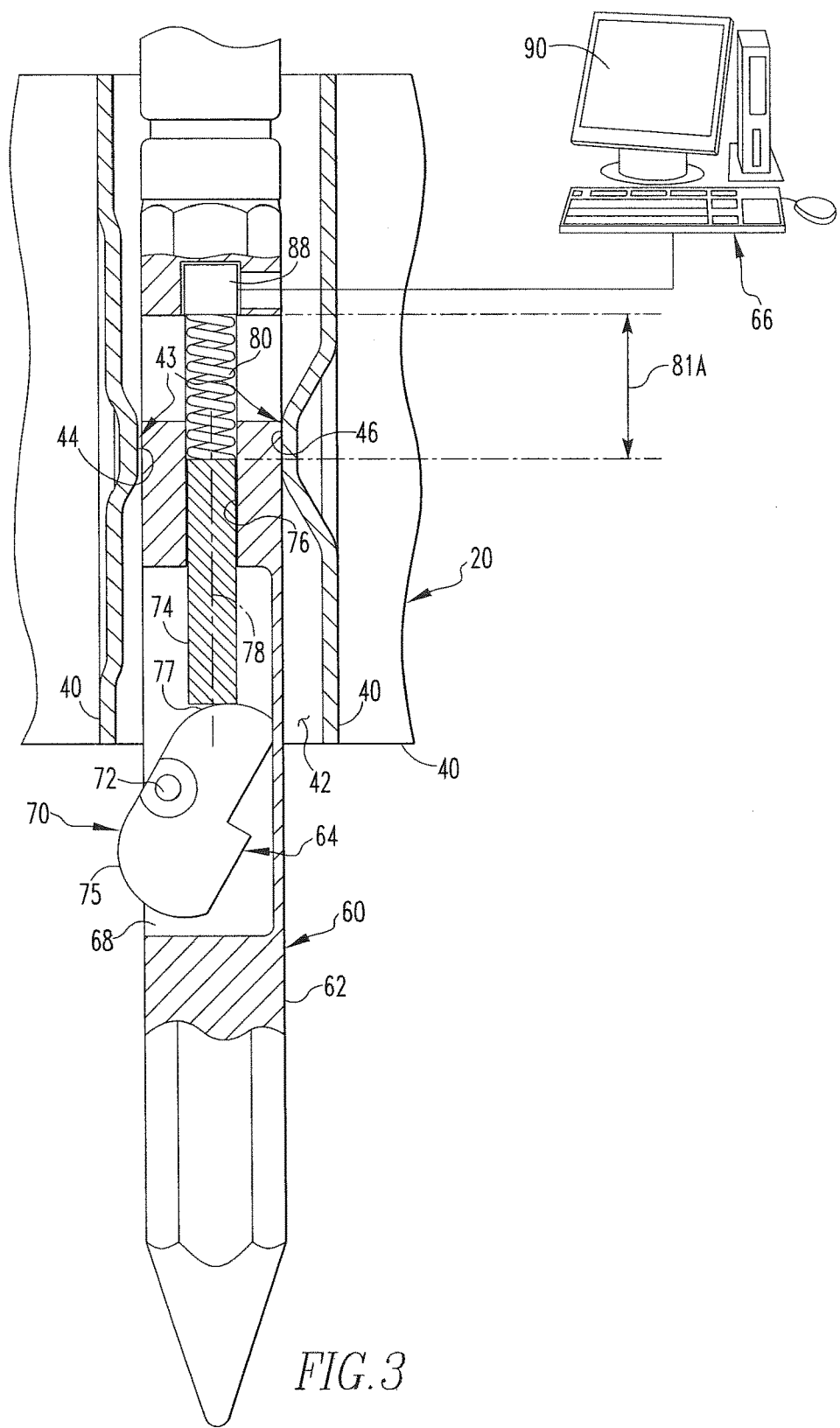
FIG. 3 is an elevational view, partially cutaway, of a detection apparatus of the measurement apparatus of FIG. 2 extending through a cell of a grid and with a follower assembly of the detection apparatus being in a free state disengaged from the cell.

The indicator apparatus 66 is schematically depicted in FIGS. 3 and 4 as being a computerized device that typically is connected electronically with a sensing device in the leg 54. The indicator apparatus 66 typically will remain situated in a stationary location spaced from the leg 54.

As can be understood from FIGS. 3 and 4, the detection apparatus 60 can be said to include a housing 62 upon which is situated a follower assembly 64 and a sensor 88 of the indicator apparatus 66. The housing 62 has a cavity 68 within which at least a portion of the follower assembly 64 is situated. The follower assembly 64 can be said to include a first follower 70 that is pivotably situated on the housing 62 and that pivots about a stationary hub 72. The first follower 70 can be viewed as being a follower, and it includes a first arcuate surface 75 and a second arcuate surface 77 that are situated equal distances from the hub 72 and which have arcuate profiles that are mirror images of one another. The follower assembly 64 further includes a second follower 74 that is movably situated in an elongated channel 76 that is in communication with the cavity 68. The second follower 74 can be viewed as being another follower, and it is translatable in a reciprocating fashion along a straight axis 78 that extends through the channel 76.

The follower assembly 64 further includes a spring 80 that serves as a biasing element which biases the second follower 74 in a downward direction, from the perspective of FIGS. 3 and 4. More specifically, and as can be understood from FIGS. 3 and 4, the spring 80 applies a small compressive force to the second follower 74 which biases the second follower 74 in a direction to engage the second arcuate surface 77 and to bias the first follower in a generally clockwise direction from the perspective of FIGS. 3 and 4. When the first follower 70 is in a free position disengaged from a grid 20, such as is depicted generally in FIGS. 2 and 3, the first follower 70 is rotated to its clockwise-most direction. When the measurement apparatus 52 and thus the detection apparatus 60 is pulled by the bail 56 in the upward direction from the perspective of FIG. 4, a portion 79A of the first follower 70 that protrudes from the housing 62 engages the first spring 44. That is, the first spring 44 engages the first arcuate surface 75 and thereby overcomes the bias of the spring 80 to rotate the first follower 70 in a counter-clockwise direction from the free position that is depicted generally in FIG. 3 to a rotated position that is depicted generally in FIG. 4. By rotating the first follower 70 to the position depicted generally in FIG. 4, the first follower 70 has caused the second follower 74 to travel along the second arcuate surface 77 and to move in the vertically upward direction from the perspective of FIG. 4 and to thereby change the distance between the second follower 74 and the sensor 88. Since the first and second arcuate surfaces 75 and 77 are mirror images of one another and are at the same distance from the hub, the first follower 70 has a 1:1 ratio between horizontal movement of the portion of the first arcuate surface 75 that engages the first spring 44 and the corresponding vertical movement of the second follower 74, from the perspective of FIGS. 3 and 4.

More specifically, and as can be seen in FIG. 3, when the first follower 70 is rotationally situated in its free position, the second follower 74 is at a maximum distance 81A from the sensor 88. However, when the first follower 70 is rotated to its rotated position such as is depicted generally in FIG. 4, the distance between the upper surface of the second follower 74 and the lower surface of the sensor 88, from the perspective of FIG. 4, has decreased, as is indicated at the numeral 81B.

The sensor 88 is in the exemplary form of an ultrasonic transducer, and it periodically sends out a pulse that is reflected from the second follower 74 and is then detected by the sensor 88. As a general matter, the cavity 68 and the channel 76 will be filled with water during the time when the detection apparatus 60 is received in the cell 42, so the ultrasonic pulse that is emitted by the sensor 88 travels through the water, is reflected from the upper surface of the second follower 74 (from the perspective of FIGS. 3 and 4), and is detected by the sensor 88. The proximity or distance between the sensor 88 and the upper surface of the second follower 74 (from the perspective of FIGS. 3 and 4) depends at least in part upon the distance between the first spring 44 and the first dimple 46 as measured by rotation of the first follower 70 in the counter-clockwise direction due to the first follower 70 being engaged with the first spring 44 and a portion 79B of the housing 62 being engaged with the first dimple 46. Alternatively, the sensor 88 could be a DVRT (Differential Variable Reluctance Transducer) that would be usable to measure such displacement.

As is best shown in FIG. 2, the indicator apparatus 66 can be said to include an input apparatus 82, an output apparatus 84, and a processor apparatus 86. The input apparatus 82 can include the aforementioned sensor 88 and other input devices such as a keyboard, a mouse, and other such input devices. The output apparatus 84 includes a visual display 90 and can include other output devices such as printers, audio output devices, and the like without limitation.

The processor apparatus 86 can be said to include a processor 92 and a storage 94. The processor 92 can be any of a variety of processors such as microprocessors or other types of processors without limitation. The storage 94 can be any of a variety of storage devices such as RAM, ROM, EPROM, FLASH, and the like that may operate in the fashion of a memory bank or other storage area internal to a computerized device and can additionally or alternatively operate as a non-transitory storage medium. The storage 94 has stored therein a number of routines 96 that are executable on the processor 92 to cause the indicator apparatus 66 and thus the measurement apparatus 52 to perform certain functions. As employed herein, the expression "a number of" and variations thereof shall refer broadly to any non-zero quantity, including a quantity of one. The routines 96 can be in any of a wide variety of forms and are generally in the form of instructions that are executable by the processor 92.

The routines 96 include instructions to perform a wide variety of functions such as converting a signal that is output by the sensor 88 into a value for the compressive load that will be applied between the first spring and the first dimple 44 and 46 to a fuel rod 22 that is received therebetween. This value is based at least in part upon the distance between the first spring and the first dimple 44 and 46 as measured by the rotation of the first follower 70 to the rotated position that is depicted generally in FIG. 4. The act of rotating the first follower 70 to the rotated position depicted generally in FIG. 4, which includes the corresponding translation of the second follower 74 to its translated position that is depicted generally in FIG. 4 and the corresponding compression of the spring 80, will at least slightly elastically deflects the first spring 44 and/or the first dimple 46. As such, the routines 96 include a compensation routine 96 to correct the measured distance between the first spring and the first dimple 44 and 46 into an actual undeflected distance between the first spring and the first dimple 44 and 46. That is, a measurement routine 96 measures the distance between the first spring and the first dimple 44 and 46 when the detection apparatus 60 is interposed between, and the correction routines 96 then determines the deflection distance by which the first spring 44 and the first dimple 46 will have deflected during such measurement. The correction routine 96 employs data pertaining to the spring constant of the spring 80 and other data to determine the deflection distance. Such deflection distance is determined based at least in part upon the measured distance, and it is used to determine an actual undeflected distance between the first spring 44 and the first dimple 46. This undeflected distance is then used to consult tabular data or algorithms or the like to determine the compressive load that will be applied between the first spring 44 and the first dimple 46 to a fuel rod 22 when a fuel rod is interposed therebetween.

As can be seen in FIG. 5, the exemplary housing 62 is spaced from both the second spring 48 and the second dimple 50 when the detection apparatus 60 is interposed between the first spring 44 and the first dimple 46. In other embodiments, however, the housing 62 potentially can be engaged with either or both of the second spring 48 and the second dimple 50 without affecting the measurement of the distance between the first spring 44 and the first dimple 46. It is understood that previous measurement systems relied upon friction being applied simultaneously by the first spring/dimple pair 43 and the second spring/dimple pair 47 to a workpiece and measuring the frictional resistance to pulling of the workpiece from the cell 42. It is understood, however, that the advantageous detection system 60 presented herein directly measures the distance between the first spring 44 and the first dimple 46 only, which advantageously enables an evaluation of the first spring/dimple pair 43 without such measurement being affected by the condition of the second spring/dimple pair 47. Measurement of the distance between the second spring 48 and the second dimple 50 is separately measured by the measurement apparatus 52.

It is reiterated that the direct measurement of the distance between the first spring 44 and the first dimple 46 involves measurement of the distance between the second follower 74 and the sensor 88 to determine an actual physical distance between the first spring 44 and the first dimple 46. The routines 96 then apply a correction factor that corrects the measured distance between the first spring 44 and the first dimple 46 into an actual undeflected distance therebetween by determining the deflection between the first spring 44 and the first dimple 46 that resulted from deflection of the spring 80 and by filtering this deflection from the measured distance.

In operation, and from the perspective of FIGS. 3 and 4, the measurement apparatus 52 is inserted downward from the top of the fuel assembly 10 into an aligned series of cells that include the cell 42, and the measurement apparatus 52 is then translated in a downward direction. In so doing, the detection apparatus 60 is received between a successive spring/dimple pair of each successive cell, and each such distance between the spring and dimple of the spring/dimple pair, as corrected, is recorded. The measurement apparatus 52 is then pulled upward in the vertical direction and all of the successive distances between the successive spring/dimple pairs are then re-measured in reverse and the distances therebetween are again recorded. If the two measurements for any given spring/dimple pair are different, the smaller distance therebetween is saved and the larger distance that was recorded is discarded. The measurement apparatus 52 is then rotated 90° and the process can be repeated to measure the successive distances between the successive second spring/dimple pairs within the same successive set of aligned cells 42. Once all of the first spring/dimple pair distances and all of the second spring/dimple pair distances have been recorded and saved, the measurement apparatus 52 can then be moved to an adjacent series of aligned cells 42 and the process can be repeated until all of the distances and thus the compressive load values for all of the spring/dimple pairs of the fuel assembly 10 have been measured and have been output or otherwise recorded.

It is noted that the flag 58 is movably situated on the leg 54 in order to facilitate visualization of the location of the first follower 70 on the housing 62. The flag 58 can be moved as needed to assist in such visualization and, in this regard, can be otherwise aligned to enable a technician to visualize the location of the first follower 70 with respect to the fuel assembly 10.

To further facilitate operation of the measurement apparatus 52, the leg 54 includes an octagonal section 98 that is depicted in FIG. 2 and which is engageable between both the first spring/dimple pair 43 and the second spring/dimple pair 47 of each of two adjacent grids 20, and this facilitates maintaining the detection apparatus 60 arranged in the position depicted generally in FIG. 5 wherein it is aligned with the first spring 44 and the first dimple 46. It is further noted that the leg 54 includes a first swivel 97 and a second swivel 99 which together operate as a limited rotation universal joint. That is, the first and second swivels 97 and 99 together permit the detection apparatus 60 to pivot, from the perspective of FIG. 2, in the left-right direction and in the fore-aft direction by only a few degrees. This advantageously avoids permitting the detection apparatus 60 from undesirably entering the wrong cell while still provides at least a slight amount of pivoting between the detection apparatus 60 and the leg 54. The winch that lifts the bail 56 may additionally be equipped with a load cell that will shut the winch off if the axial loading exceeds a predetermined value such as would indicate that the measurement apparatus 52 has somehow become hung up or blocked by a portion of the fuel assembly 10. The load cell would shut off the winch in a fashion that would advantageously avoid damage to the fuel assembly 10.

It thus can be seen that the improved measurement apparatus 52 enables the direct measurement of the distance between the spring and dimple of each spring/dimple pair in a fuel assembly 10, which enables the indicator apparatus 66 to output an indication of the compressive load that will be applied by each spring/dimple pair to a fuel rod inserted therebetween. Other advantages will be apparent.

While specific embodiments of the invention have been described in detail, it will be appreciated by those skilled in the art that various modifications and alternatives to those details could be developed in light of the overall teachings of the disclosure. Accordingly, the particular embodiments disclosed are meant to be illustrative only and not limiting as to the scope of the invention which is to be given the full breadth of the appended claims and any and all equivalents thereof.

What is claimed is:

1. A measurement apparatus structured to be received between a spring and a dimple, the measurement apparatus comprising:
    a support having a housing, a portion of the housing being structured to physically contact one of the spring and the dimple;
    a follower movably situated on the support, a portion of the follower being situated opposite the portion of the housing, and being biased in a direction generally away from the portion of the housing, the portion of the follower being structured to be physically contacted by the other of the spring and the dimple and to have its bias overcome to move the follower between a first position out of physical contact with the other of the spring and the dimple and a second position in physical contact with the other of the spring and the dimple; and
    an indicator apparatus structured to provide an indication that is representative of an amount of compressive loading between the spring and the dimple, the indication being based at least in part upon the distance between the portion of the housing and the portion of the follower in the second position.

2. The measurement apparatus of claim 1 wherein the indicator apparatus comprises a sensor and a processor apparatus, the sensor being structured to output a signal that is representative of the amount of compressive loading and that is based at least in part upon a position of the follower with respect to the sensor, the processor apparatus being, structured to receive the signal and to output the indication based at least in part upon the signal.

3. The measurement apparatus of claim 2 wherein the follower is pivotably situated on the support and is pivotable between the first and second positions.

4. The measurement apparatus of claim 3 wherein the indicator apparatus comprises another follower that is translatable along a straight axis between another first position and another second position, the another follower being engaged with and moving with the follower as the follower moves to its second position, the another follower being in the another second position when the follower is in its second position.

5. The measurement apparatus of claim 2 wherein the sensor is structured to output as the signal a signal that is based at least in part upon a proximity of the another follower to the sensor.

6. The measurement apparatus of claim 1 wherein the portion of the housing and the portion of the follower are interposed between the spring and the dimple in the second position of the follower.

7. The measurement apparatus of claim 1 wherein the support further includes an elongated leg from which the housing and the follower are suspended, the support further including a flag that protrudes from the leg, the flag being movably situated on the leg to be alignable with the follower.

* * * * *